(12) United States Patent
Arden et al.

(10) Patent No.: US 11,686,573 B2
(45) Date of Patent: Jun. 27, 2023

(54) FRINGE PROJECTION FOR IN-LINE INSPECTION

(71) Applicant: LMI Technologies Inc., Delta (CA)

(72) Inventors: Terence Arden, Delta (CA); Robert Loewen, Delta (CA); Oleksiy Gukov, Delta (CA)

(73) Assignee: LMI TECHNOLOGIES INC., Delta (CA)

( * ) Notice: Subject to any disclaimer, the term of this patent is extended or adjusted under 35 U.S.C. 154(b) by 1073 days.

(21) Appl. No.: 15/331,647

(22) Filed: Oct. 21, 2016

(65) Prior Publication Data

US 2018/0106593 A1 Apr. 19, 2018

(30) Foreign Application Priority Data

Oct. 13, 2016 (CA) .................. CA 2945256

(51) Int. Cl.
| | |
|---|---|
| *G01B 11/00* | (2006.01) |
| *G06T 7/00* | (2017.01) |
| *G01B 11/25* | (2006.01) |
| *G06T 7/521* | (2017.01) |
| *H04N 23/60* | (2023.01) |
| *H04N 13/254* | (2018.01) |
| *H04N 13/243* | (2018.01) |

(52) U.S. Cl.
CPC ........ *G01B 11/002* (2013.01); *G01B 11/2513* (2013.01); *G01B 11/2545* (2013.01); *G06T 7/0004* (2013.01); *G06T 7/521* (2017.01); *H04N 13/243* (2018.05); *H04N 13/254* (2018.05); *H04N 23/60* (2023.01); *G06T 2207/10012* (2013.01); *G06T 2207/10016* (2013.01); *G06T 2207/10021* (2013.01); *G06T 2207/30164* (2013.01)

(58) Field of Classification Search
CPC .............. G01B 11/002; G01B 11/2513; G01B 11/2545; G06T 7/73; G06T 7/97; G06T 7/0004; G06T 2207/10012; G06T 2207/10021; G06T 2207/30164; G06T 7/521; G06T 2207/10016; H04N 13/254; H04N 13/243; H04N 5/232; H04N 23/60
USPC ........................................................ 348/94
See application file for complete search history.

(56) References Cited

U.S. PATENT DOCUMENTS

| | | | |
|---|---|---|---|
| 4,933,673 A * | 6/1990 | Ishizuka .................. | G01D 5/38 341/13 |
| 5,615,003 A | 3/1997 | Hermary et al. | |
| 5,691,811 A * | 11/1997 | Kihira .................. | G01N 21/896 356/239.1 |
| 5,986,745 A | 11/1999 | Hermary et al. | |
| 2004/0246473 A1 | 12/2004 | Hermary et al. | |
| 2014/0028801 A1 * | 1/2014 | Tin ......................... | G01N 21/55 348/46 |

FOREIGN PATENT DOCUMENTS

WO 2014088709 A1 6/2014

\* cited by examiner

*Primary Examiner* — Matthew K Kwan
(74) *Attorney, Agent, or Firm* — Stoel Rives LLP

(57) ABSTRACT

A structured light pattern comprising at least two sub-patterns in the direction of motion are projected onto an object during in-line inspection. Images of the object are captured for each sub-pattern. The sub-patterns are used to establish correspondence and to construct a profile using dense per pixel camera-projection correspondence.

17 Claims, 10 Drawing Sheets

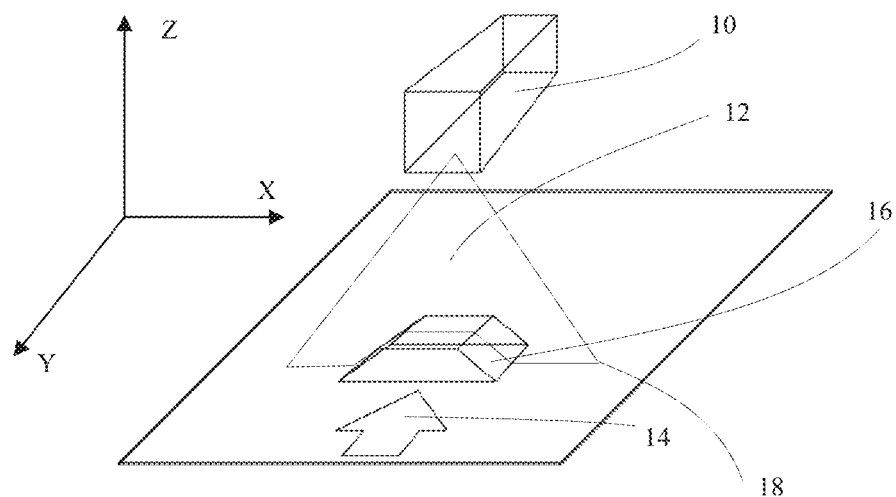
Fig. 1 (Prior Art)
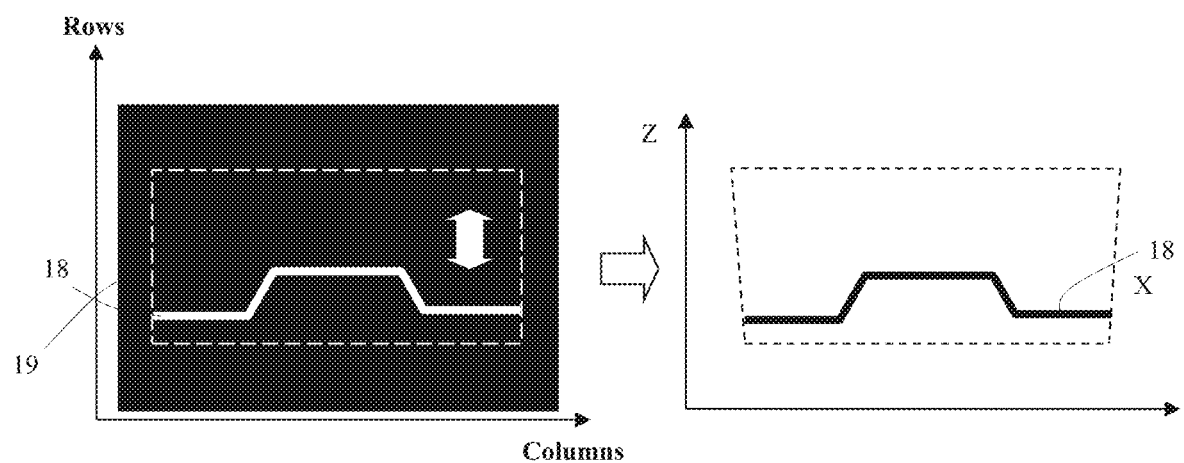
Fig. 2(a) (Prior Art)
Fig. 2(b) (Prior Art)

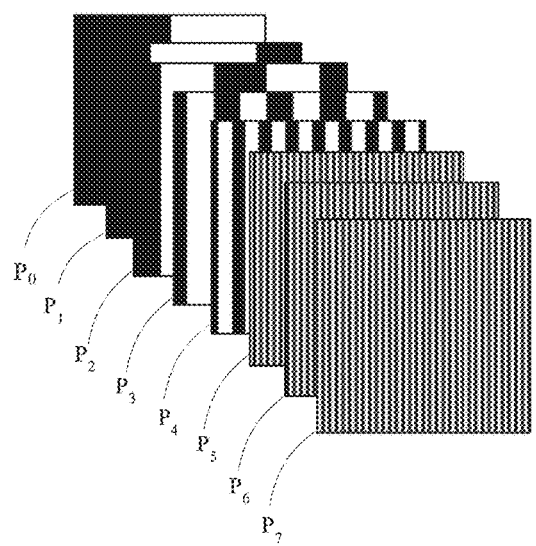
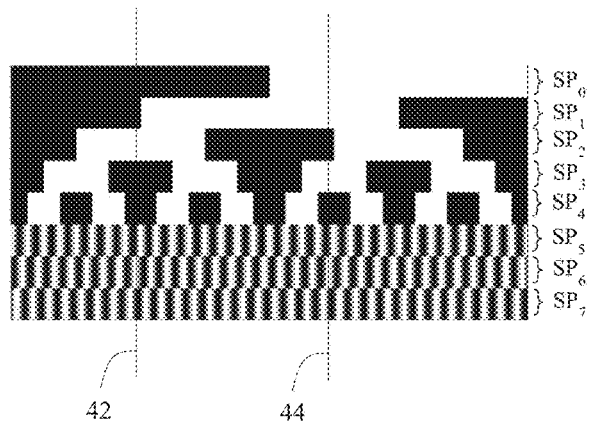
Fig. 5(a)
(Prior Art)
Fig. 5(b)
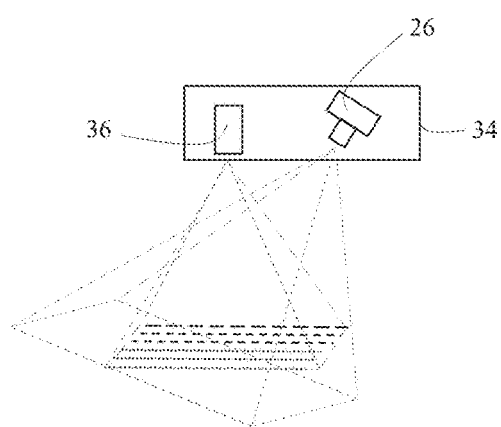
Fig. 6

FRINGE PROJECTION FOR IN-LINE INSPECTION

FIELD OF THE INVENTION

This invention relates to in-line inspection systems using structured light, in which successive images are taken of an object as it travels through the structured light in order to extract 3D coordinates for points on the object.

BACKGROUND OF THE INVENTION

Traditional line profilers are commonly used in industrial in-line part inspection due to their high speed. A typical laser line profiler is configured to project a single line, which is imaged by a single camera.

As shown in FIG. 1 the scanning configuration typically involves positioning the sensor 10 such that a plane 12 of light is oriented transversely to the direction of travel 14 of the part 16. For each camera frame the image coordinates of the reflected laser light are converted to ranges using triangulation. As the part moves through the laser plane, the resulting profile slices are aggregated to reconstruct the 3D surface geometry of the part. The maximum camera acquisition rate and processing speed of the sensor determines how densely the individual frames can be sampled along the direction of travel.

Once the full 3D scan of the part is acquired, it is used to perform various measurements, such as step height, distance between features, drilled hole diameter, stud length and orientation, etc.

Typically, the internal geometry of a line profiler is configured such that the laser line 18 aligns to the horizontal axis 19 of the imager as shown in FIG. 2. Changes in depth of the imaged target translate into changes in the row positions of the reflected line. Since, typically, the number of used imager rows maps directly to the speed of the imager, designers can trade off speed for FOV and accuracy. At a given image magnification, reducing the operating depth of the sensor translates into fewer imager rows and higher speed.

Extraction of high intensity points (often referred to as spots) is also limited by the number of used image rows. To extract the position of the laser line on the image with subpixel precision, multiple pixels around the peak are usually interpolated. An increase in magnification thus improves spot detection precision at the cost of the overall FOV.

These limitations lead to trade-offs between acquisition speed, accuracy and FOV of the system. These stem from the fact that each image must produce a self-contained profile.

U.S. Pat. No. 5,615,003 to Hermary et. al describes a linear structured light sensor for log scanning applications. The scanner relies on a periodic linear pattern and a linear (1D) camera to establish correspondence between the light source and the image. The single pattern consists of varying length dashes, separated by varying length gaps. During operation, the processing logic of the scanner identifies the edges of the dashes (feature points) and uses local relationships between adjacent gap and dash lengths to determine which portion of the pattern is being imaged.

Each image frame can produce a self-contained range profile, but a significant disadvantage is that the output of the triangulation is limited only to distinct feature points, which in this case are edges of the pattern dashes. Hermary alludes to the use of a two-dimensional grid rather than a linear pattern however no specific methodology is suggested and the single example given does not appear suited to determining unique per-pixel correspondence.

WO2014088709 to Faro Technologies describes a structured light scanner intended for real-time full field acquisition. The method uses two-dimensional spatial encoding to resolve local pattern features and establish correspondence for the entire pattern in a single frame. Specifically, the two-dimensional pattern is a series of saw tooth lines with varying period. Using local relationships between the spacing of adjacent lines and the period of the saw tooth edges, the lines can be uniquely identified. The Faro sensor operates on a full-field pattern, allowing each camera frame to produce full surface correspondence. However, correspondence can only be established along distinguishing features in the pattern. Since, by design of the correspondence methodology, the line spacing must be coarse, the scanner cannot produce dense per-pixel correspondence along the lateral axis of the pattern.

It is therefore an object of this invention to improve the in-line inspection of objects by a method and system that offers high acquisition speeds (as distinguished from processing speed) and greater subpixel accuracy relative to the prior art.

The objects of the invention will be better understood by reference to the detailed description of the preferred embodiment which follows. Note that the objects referred to above are statements of what motivated the invention rather than promises. Not all of the objects are necessarily met by all embodiments of the invention described below or by the invention defined by each of the claims.

SUMMARY OF THE INVENTION

By projecting and imaging a two-dimensional structured light pattern and combining several temporally sequential images of the moving part to establish correspondence, higher acquisition speeds and subpixel accuracy relative to a comparable single line profiler implementation and to the prior art are achievable.

The projected two-dimensional pattern consists of several sub-pattern rows projected together for each image capture as shown in FIG. 3. The sub-patterns 20 are oriented substantially orthogonally to the axis of motion 22 of the object 24. As the object passes through the projected pattern in the direction of motion 22, each object point of interest is eventually imaged under each individual sub-pattern. By using several locally non-unique (e.g. periodic) sub-patterns and decoding their combination in travel space (using predictable or tracked object motion) the method is able to produce dense per-pixel correspondence and can achieve high acquisition speeds, as the image height is minimized.

Unlike a traditional line profiler, this approach uses a two-dimensional structured light pattern to establish correspondence. The pattern 20 itself consists of several linear sub-pattern rows (shown as dashed lines in FIG. 3). The sub-patterns consist of rows extending along a nominal X axis that is substantially orthogonal to the direction of travel 22 of the object (a nominal Y axis). The sub-patterns vary in intensity only along such X axis and are substantially parallel to one another within the overall two-dimensional pattern.

In order to minimize the number of imager rows in use, the system camera 26 is preferably positioned such that the X axis aligns to the rows of the imager 28 so that both are aligned along the triangulation axis of the sensor. As a result, the pattern shifts laterally (30) on the camera image as the depth of the surface changes as shown in FIG. 4(a). Changes in depth of the scanned object translate into changes in the column value of the corresponding imaged points on the imager as shown in FIG. 4(a) and as reflected in the graph of FIG. 4(b).

In order to establish correspondence along the X axis of the pattern, a design requirement for the overall two-dimensional pattern is that along any vertical (Y) slice of the pattern, the combination of projected intensities contributed by the various sub-patterns along the vertical slice must be unique. A preferred two-dimensional pattern for meeting such a requirement to a sub-pixel resolution involves a combination of sub-patterns that include phase patterns.

FIG. 5 (a) is an example a temporal (at successive times) sequence of images $P_0$-$P_7$ consisting of Gray code and phase pattern images, as used in some prior art stationary structured light systems to produce unique lateral correspondence. Note that although the forward most three images appear to be identical, they have the same periodic patterns but with slightly different phases. The effect of temporally separate sequences are achieved in the in-line application according to the present invention by producing a single two-dimensional pattern, as shown in FIG. 5(b) where each sub-pattern row $SP_1$-$SP_8$ corresponds to an image of a Gray code. As the object sweeps through the pattern, the projection of each sub-pattern is successively imaged for every point of interest on the object.

An advantage of this design is that the number of imager rows used (and thus, the speed that can be achieved) is dictated by the number of sub-patterns being projected. In the ideal case, where camera distortion, perspective and resolution differences between camera and projector are not a factor, the number of required imager rows is equal to the number of projector sub-patterns. The number of imager columns determines both the operating range and the X resolution, and can be maximized without compromising the overall speed of the system.

In one aspect the invention is a method for determining three-dimensional coordinates of a plurality of object points of an object moving in a direction of motion along an inspection path in an in-line inspection system. The method involves projecting onto the path structured light forming a two-dimensional pattern. Any slice of the pattern in the direction of motion is unique within the pattern and the pattern consists of at least two linear sub-patterns disposed in parallel to one another. Each of the sub-patterns varies in intensity only along a direction that is substantially orthogonal to the direction of motion. Images of the structured light are captured in time sequence as reflected from the object points as the object moves along the path so as to produce, for each object point, at least one image of each of the sub-patterns. The images are analyzed to determine correspondence between the images in relation to the object points by reference to at least two of the said sub-patterns and three-dimensional coordinates are determined for each of the object points.

The method can further include the two-dimensional pattern in relation to a camera having a two-dimensional imager array such that an axis of the array is substantially parallel to the linear sub-patterns.

The sub-patterns may comprise at least one binary intensity sub-pattern and at least one continuously varying sub-pattern.

The method can further include the performance of an in-field calibration to determine the respective precise positions and orientations of the respective sub-patterns in relation to the direction of motion.

A single light projector may be used to emit the two-dimensional pattern while the imaging is done by a single camera having a two-dimensional imager array.

Instead of a two-dimensional camera, the images may be captured by a plurality of linear array one-dimensional cameras, each camera being aligned to image respective ones of the sub-patterns.

The imaging may be performed by a plurality of cameras each having a two-dimensional imager array and respectively different fields of view of the object.

The method may include using a plurality of projectors, each emitting respective ones of the sub-patterns. That can also be done while using a plurality of linear array one-dimensional cameras, each camera being aligned to image respective ones of the sub-patterns.

In another aspect, the invention is an optical three-dimensional scanning system comprising a conveyor for conveying an object in a direction of motion along an inspection path in an in-line inspection system, at least one projector configured to project onto the path structured light forming a two-dimensional pattern. The two-dimensional pattern is such that any slice of the pattern in the direction of motion is unique within the pattern. The two-dimensional pattern comprises at least two linear sub-patterns disposed in parallel to one another and each sub-pattern varies in intensity only along a direction that is substantially orthogonal to the direction of motion. The system further includes camera(s) coupled to the projector(s) and configured to capture temporally sequential images of the structured light as reflected from the object as it moves along the path, so as to produce, for each of a plurality of object points of interest, at least one image of each of the sub-patterns. The system further includes a processor coupled to the camera to determine correspondence between the temporally sequential images by reference to at least two of said sub-patterns and to determine three-dimensional coordinates of the object points of interest.

The camera of the system may comprise a two-dimensional imager array and the projector(s) configured to project the two-dimensional pattern such that an axis of the array is substantially parallel to the linear sub-patterns.

The sub-patterns may comprise at least two sub-patterns, including at least one of binary intensity and at least one of continuously varying intensity.

The projector(s) may be a single light projector emitting the two-dimensional pattern while the at least one camera is a single camera.

The camera(s) may consist of a plurality of linear array one-dimensional cameras, each camera being aligned to image respective ones of the sub-patterns.

The camera(s) may consist of a plurality of cameras each having a two-dimensional imager array, each camera having respectively different fields of view of the object.

The projector(s) may consist of a plurality of projectors, each emitting respective ones of the sub-patterns while the camera(s) consist of a plurality of linear array one-dimensional cameras, each camera being aligned to image respective ones of the sub-patterns.

The foregoing may cover only some of the aspects of the invention. Other aspects of the invention may be appreciated by reference to the following description of at least one preferred mode for carrying out the invention in terms of one or more examples. The following mode(s) for carrying out the invention is not a definition of the invention itself, but is only an example that embodies the inventive features of the invention.

BRIEF DESCRIPTION OF THE DRAWINGS

At least one mode for carrying out the invention in terms of one or more examples will be described by reference to the drawings thereof in which:

FIG. 1 is a schematic of a typical prior art in-line inspection system;

FIG. 2(a) is a depiction of the output of the imager array for a projected laser line according to the prior art;

FIG. 2(b) is a graph of the Z-axis (range) output of the imager array of FIG. 2(a) according to the prior art;

FIG. 5(a) is an example of a Gray code and phase pattern series of images as sometimes used in the prior art;

FIG. 5(b) shows a two-dimensional pattern according to the preferred embodiment of the invention;

FIG. 6 is a diagram of the optical configuration of the preferred embodiment of the invention;

DETAILED DESCRIPTION OF AT LEAST ONE MODE FOR CARRYING OUT THE INVENTION IN TERMS OF EXAMPLE(S)

Figure 3:
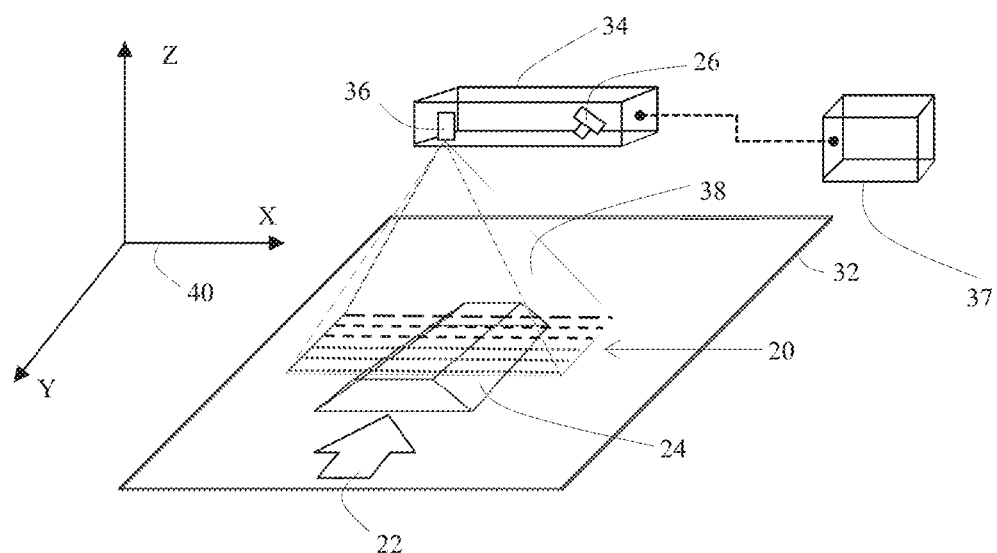
FIG. 3 is a schematic of the optical configuration of the sensor, the projected structured light pattern and the direction of travel according to the preferred embodiment.

FIGS. 3 and 6 show the optical configuration of a preferred embodiment of the invention. An object or part 24 is conveyed along an inspection path on conveyor 32 in the direction of motion indicated by arrow 22 in an in-line inspection system.

A sensor head 34 includes a structured light projection system 36, a 2D array camera or imager 26 and a processor 37. The light projection system 36 and the imager 26 are configured within the sensor head 34 with a projection plane and a field of view 38 suitable for optical triangulation depth and coordinate imaging.

The preferred embodiment includes an encoder device (not shown) which tracks the position of the object along the axis of motion.

In the preferred embodiment, the structured light projection system 36 comprises a two-dimensional light projection based on an LED light source and a two-dimensional grating mask.

The structured light consists of a single two-dimensional spatial pattern 20 comprising several row-like sub-patterns, disposed substantially in parallel to one another as shown in FIGS. 3, 4(a), 5(b), 6, 7, 10 (a) and 10 (b). In FIG. 5(b), the row-like sub-patterns are labelled $SP_0$ to $SP_7$. Each sub-pattern $SP_0$-$SP_7$ is defined along a longitudinal axis 40 which, when projected into the inspection path, is substantially orthogonal of the direction of travel 22 of the object. In the reference system used herein, axis 40 corresponds to the X axis of the system. Each sub-pattern is linear in the sense that the intensity varies only along that orthogonal direction 40.

The overall two-dimensional pattern 20 is such that any vertical (Y axis) slice 42, 44, etc. of the overall pattern 20 is unique in relation to every other vertical slice in the pattern. Such uniqueness can be ensured in the preferred embodiment by combining at least one coarse binary-intensity (Gray code) sub-pattern ($SP1$-$SP_5$ in the preferred embodiment) with at least one continuously varying sub-pattern (e.g. modulated phase sub-patterns $SP_6$-$SP_8$ illustrated in FIG. 5(b); labeled as sub-patterns 5-7 in FIG. 10(a)). In the preferred embodiment, the continuously varying sub-patterns are periodic and vary in phase from one another.

Images of the reflected two-dimensional pattern are captured sequentially as the object traverses the pattern along the Y axis (direction of travel) such that each object point of interest is eventually imaged under each individual sub-pattern.

Figure 4:
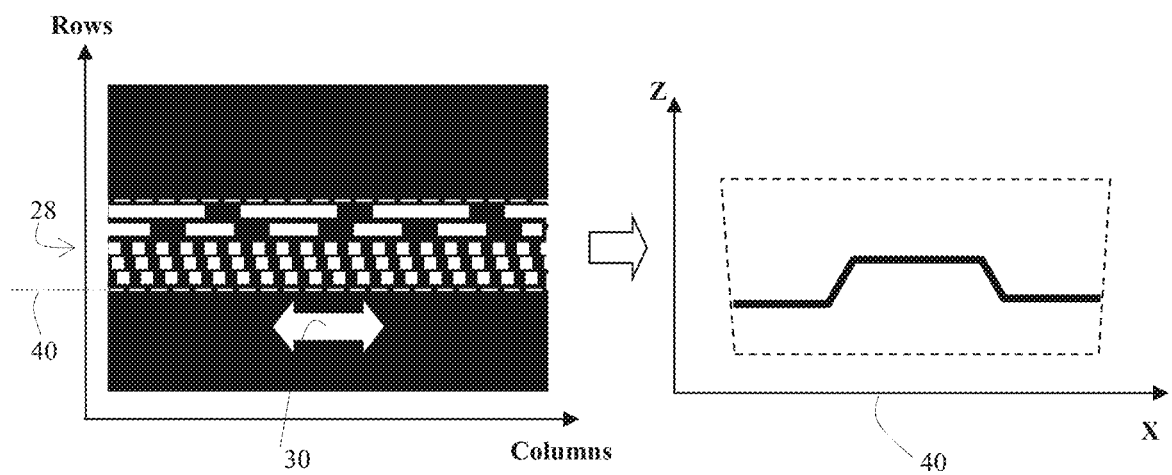
FIG. 4(a) is a depiction of the output of the imager array for the projected pattern of the preferred embodiment showing the direction of displacement with range.
FIG. 4(b) is a graph of the Z-axis (range) output of the imager array of FIG. 4(a)

The system camera 26 is positioned such that the rows of the imager 28 align to the X axis 40. The two-dimensional pattern is preferably oriented in relation to the camera's two-dimensional image array such that an axis of the array is substantially parallel to the linear sub-patterns. The reflected pattern shifts laterally (arrow 30) on the camera image as the depth of the surface changes as shown in FIG. 4. Changes in range/depth of the scanned object points are determined from changes in the column value on the imager 28.

As noted above, FIGS. 10(a) and 10(b) show the preferred embodiment of a two-dimensional structured light pattern according to the invention. The pattern sequence consists of eight linear sub-patterns. Each sub-pattern provides an encoding that contributes to establishing overall correspondence between the camera and projector coordinates. As the object passes through the sub-patterns (along the Y axis), each object point of interest is eventually imaged by each of the sub-patterns.

A sequence of sub-patterns is chosen such that, along any Y slice, the combination of sub-pattern intensities uniquely determines the X coordinate of that slice. A sequence of Gray code sub-patterns 1-5 and periodic phase sub-patterns 6-8 is an example of such pattern. Such patterns are used in stationary structured light systems to help establish global (Gray code) and local (phase) correspondence between the projection and the imager with very high accuracy.

The first five Gray code sub-patterns are used to establish global coarse correspondence, while the latter three sinusoidal sub-patterns with increasing phase value (generally referred to as phase patterns) assist in determining local subpixel correspondence.

While the combined Gray code and phase shifting method is an example of a pattern sequence that is preferably used in the in-line system of the invention, the method is not limited to it. Depending on the accuracy and speed trade-offs, the pattern may include only binary or phase images. Multiple density phase waves can be used to substitute for the Gray code. Aperiodic continuous wave patterns are also suitable for this approach.

The exact pattern design and the number of sub-patterns are in part dictated by the type of the light emitter itself. For example, laser and diffractive element based light sources may be more cost effective to manufacture and may produce higher power density than projector-based lights, but may only be limited to binary patterns.

Overview of the Process

The sensor is factory calibrated to establish correspondence between the camera(s) and the projection. Specifically, factory calibration captures the vertical image location of each sub-pattern, and determines the mapping between lateral image positions of each sub-pattern point as a function of range.

The method of the invention relies on aligning several images, captured over the duration of object travel, in a way that provides the intensity of each sub-pattern for a given physical point. Because of this requirement, an in-field calibration is also needed to reliably determine the precise respective positions and orientations of the sub-patterns in relation to the direction/axis of motion. A calibration target with known dimensions and geometry is scanned, allowing the system to record the precise direction of the axis of motion and as well as to determine the X, Y offsets of individual sub-patterns in world coordinate space.

During the acquisition process, the part sweeps through the projection and is imaged by the sensor camera. Corresponding sub-pattern points imaged over the duration of a sweep are sampled and aligned, such that, for each physical object point the full sequence of sub-pattern intensities is acquired. From the sub-pattern intensities, the sensor establishes correspondence between the camera and projection coordinates. The results are then triangulated to produce a 3D height map of the full object surface, resulting in 3D coordinates for the points.

In-field calibration captures correspondence between sub-patterns with respect to the object's axis of motion. The configuration of the target system and the complexity of the in-field calibration process add further considerations to the projected pattern design. For example, in the case of a combined Gray code and phase shifting approach, repeating the last phase sub-pattern at the beginning of the sequence allows for fine adjustment of the axis of motion calculation during each scan.

Factory Calibration

Factory calibration captures the relationship between the camera and projection geometry. Specifically, its objectives are as follows:
Determine the rectification mapping between the camera and the projection. Rectification is a static transformation of the camera image which maps the rows of the projected pattern onto transformed image rows. This significantly simplifies further processing, as movement of the object in the Z axis results in only lateral displacement on the rectified image. This step accounts for camera distortion, misalignment and scaling differences between the projector and the camera.
Determine the mapping between displacement of the projector in the rectified space and the corresponding surface world coordinates. This mapping is used to calculate ranges after correspondence between camera and projector points has been established.

Figure 11:
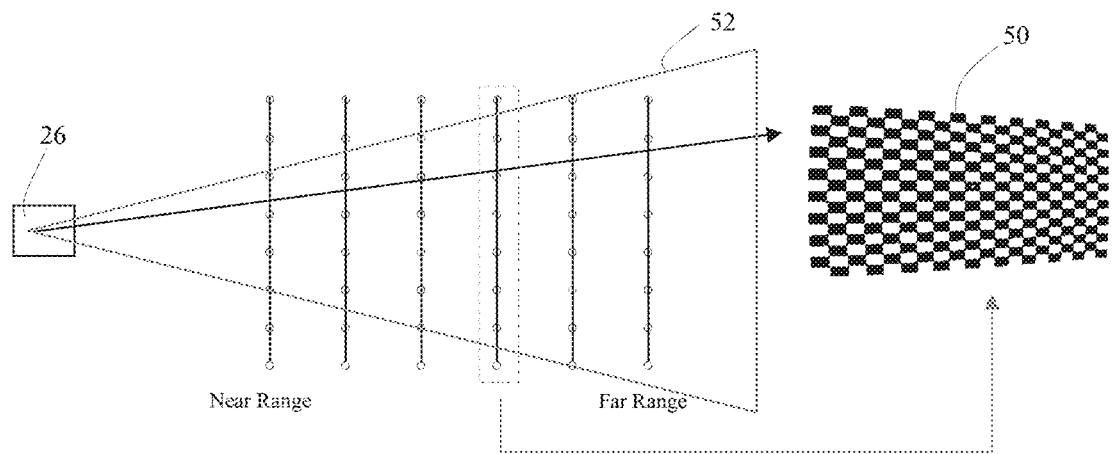
FIG. 11 illustrates factory calibration of the system of the invention using a checkerboard target pattern.

Calibration is performed by placing a target with known features (e.g. a checkerboard 50 as shown in FIG. 11) in the field of view 52 of the sensor and moving it through a known sequence of positions (Near Range to Far Range in FIG. 11) within the operating range of the sensor. The captured world and image coordinates of the calibration target features are then used to determine the mapping between each camera pixel and a world space ray. By illuminating the calibration target with the projection and imaging it with the sensor camera, the mapping between projector pixels and world rays is also determined.

Figure 12:
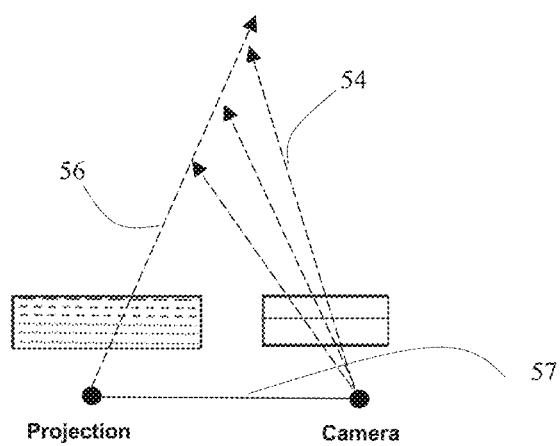
FIG. 12 illustrates the rectification transformation as part of the factory calibration of the system of the invention.

Once the world ray mapping for camera and projector is established, rectification transformation for the camera images is computed. As illustrated in FIG. 12 this is done by projecting the camera rays 54 onto a plane 56 in the world space that is aligned to the baseline 57 of the system. As a result, each sub-pattern can be located along a known row position of the rectified image and only moves laterally along the X axis with changes in scanned object depth.

In Field Calibration

In order to establish correspondence between the camera and the projection for the entire object surface, the sensor must be able to acquire projection intensity over all of the sub-patterns for each object point. During any single camera frame each object point is only imaged with a single sub-pattern. To acquire the full projection sequence several images must be aligned.

In field calibration achieves two objectives:
The process must determine the travel offsets (in Y axis) between the sub-patterns.
The process must determine the lateral offsets between sub-patterns. A small lateral angle (in the X-Y plane) in the axis of motion will always exist. Additionally, smooth changes in depth of the object during travel are also expected.

Both objectives are achieved by scanning a calibration object with known two dimensional features before proceeding with image acquisition. One example of a calibration object is a rectangular bar with several saw tooth corners along the leading edge. The corners are simple to detect and track over several camera frames.

Figure 13:
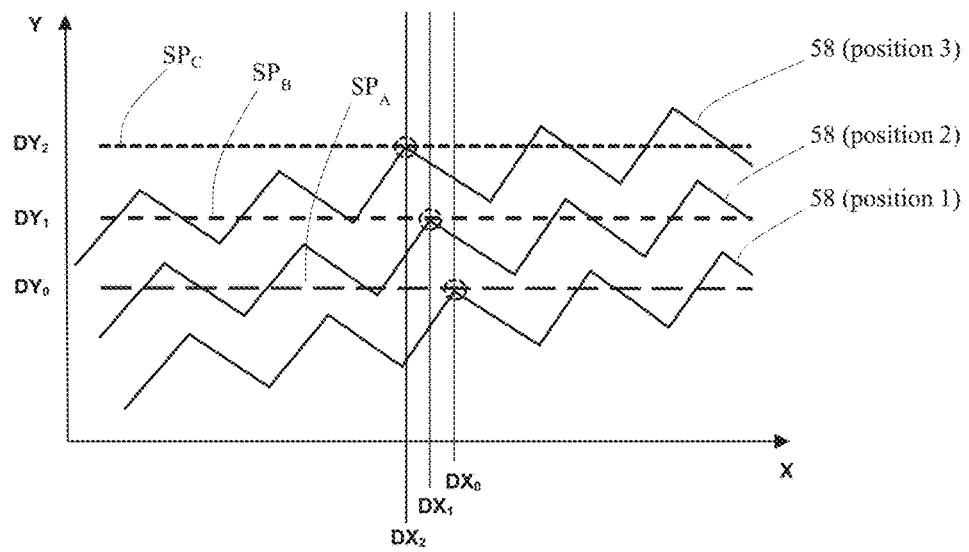
FIG. 13 shows the image outputs during in field calibration of the preferred embodiment of the invention.

Referring to FIG. 13, the calibration object (shown on the diagram at multiple positions as the saw tooth line 58) is passed through the pattern (three sub-patterns $SP_A$, $SP_B$, $SP_C$ shown in FIG. 13 as dashed lines). By detecting and tracking known features of the object, the system determines the travel spacing of the patterns (Y axis) as well as the lateral drift of the object along the axis of motion.

In the FIG. 13, the encoder offsets for the individual sub-patterns are indicated as $DY_0$, $DY_1$ and $DY_2$ respectively for sub-patterns 0, 1 and 2. Rectified X offsets determined by observing the shift in the lateral position of calibration target corners are indicated as $DX_0$, $DX_1$, $DX_2$. Since all sub-patterns are aligned to the first sub-pattern along both X and Y axis, $DX_0$ and $DY_0$ are zero in this example.

The computed Y offsets are used to align and stitch intensities of individual sub-patterns over time, producing one continuous Y-resampled image per sub-pattern. The X offsets (computed in rectified space) are used to both align the sub-images laterally as well as to compute the expected mapping between the pattern intensities and pattern coordinates. The accuracy of this step is important, as the intensity sequence corresponding to a particular pattern column (at the nominal sub-pattern 0) will change each time the alignment of the sensor with respect to the axis of motion changes.

To alleviate reliance on high accuracy travel drift calibration, it is also possible to embed an alignment sub-pattern into the projection. Since drift due to travel is linear, ensuring that the first and the last pattern in the sequence are identical can assist in fine alignment at run time. For Gray code and phase shift sequence, this can be achieved by duplicating the last phase sub-pattern at the beginning of the sequence.

In this case, travel calibration is still used to perform Y offset calculation and gross X alignment, while local matching of the intensities between the first and the last pattern allows for estimation of small variations in the axis of travel from scan to scan.

Figure 14:
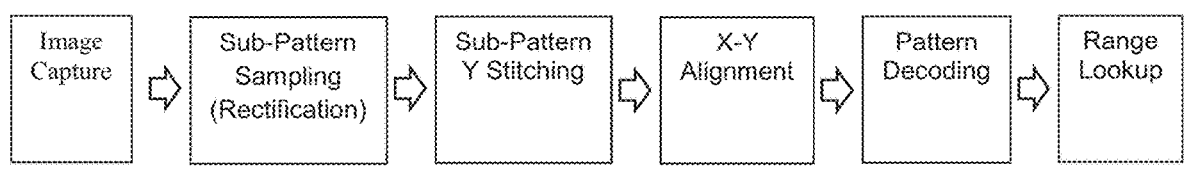
FIG. 14 is a flowchart of the principal steps of the preferred embodiment of the invention.

The scanning process itself can be broken into the following steps, illustrated in FIG. 14:

Image Capture/Acquisition

The part 24 is moved on conveyor 32 in the direction of travel 22. Its movement is preferably tracked by an encoder.

Temporally sequential camera images are captured at the minimum required frame rate of the system. Typically, overall system acquisition rate (parts per minute) determines the required object speed, which in turn drives the minimum camera frame rate required. The raw camera frame rate of the sensor must be sufficiently high to ensure that each object point of interest is imaged under each sub-pattern at least once. In some cases, it is not necessary to secure coordinates for every part of the object, in which case the object points of interest may be a subset of the entire object surface.

To ensure that further processing can correctly relate individual camera frames in the Y (travel) direction, for each camera frame the sensor records the position of the motion feedback device (e.g. the encoder).

While it is not required for the application, triggering the camera directly by the encoder simplifies further processing, as interpolation of image intensities between camera frames to a uniform Y spacing can be skipped.

Sub-Pattern Sampling and Y Stitching

Each new camera frame is rectified using factory calibration information, producing an image where columns are uniformly spaced in world coordinates (with sampling roughly equal to camera column resolution) and each projection sub-pattern is aligned to a single row.

The intensities of each sub-pattern are sampled from the rectified image and, if the camera is in free running mode, then the intensities are interpolated between the current and the previous camera frames to correspond to the next spatial reference output Y position. In the case where the cameras are not free running, but triggered at specific encoder intervals, the interpolation between camera frames is not needed.

The output is stored in dedicated intensity maps for each sub-pattern. The columns of the maps are spaced according to the rectified X sampling (roughly equal to column resolution of the sensor) and the rows correspond to Y travel intervals at which the images are captured.

Upon completion of the part sweep, each sub-pattern map will have accumulated sub-pattern intensities for each X-Z slice of the object at uniform Y spacing.

X-Y Alignment

Once the part completes the sweep through the pattern, the Y sampled sub-pattern images are aligned in both X and Y axes using in-field axis of motion mapping.

The in-field calibration procedure records the offsets between sub-patterns in X and Y axes. The offsets are distances (in world units) which match each sub-pattern to the sub-pattern 0.

Since the pixels in the sub-pattern intensity maps produced in the previous step correspond to a fixed world coordinate step in X and Y, applying these offsets amounts to simply sampling the individual map intensities at positions shifted by these offsets. Bilinear or bicubic intensity interpolation is employed to sample fractional pixel coordinates, as the offsets will not necessarily correspond to the exact pixel locations in the sub-pattern intensity maps.

Another aspect of this invention is an option to design the projection pattern such that lateral (X) offsets between sub-patterns are determined dynamically. Temperature shifts, ongoing vibration may cause the system to drift over time from the geometry captured during in-field calibration. If long term stability is deemed to be a risk for the application, the sensor pattern design should incorporate an alignment sub-pattern as the first and last sub-pattern. The example presented in an earlier section, includes the last phase sub-pattern both at the beginning and the end of the projection.

The lateral drift of the part through the projection can then be estimated by determining the X offset at which the difference between intensities of the first and the last sub-pattern is minimized. Sum of squared or absolute intensity differences are both reasonable metrics to minimize. Since the overall part drift through the projection is expected to be linear, the lateral offsets of the intermediate sub-patterns can then be estimated through linear interpolation.

As a result of this step, the individual pixels within sub-pattern intensity maps correspond to the same physical object points and can be combined in the subsequent correspondence calculation.

Figure 15:
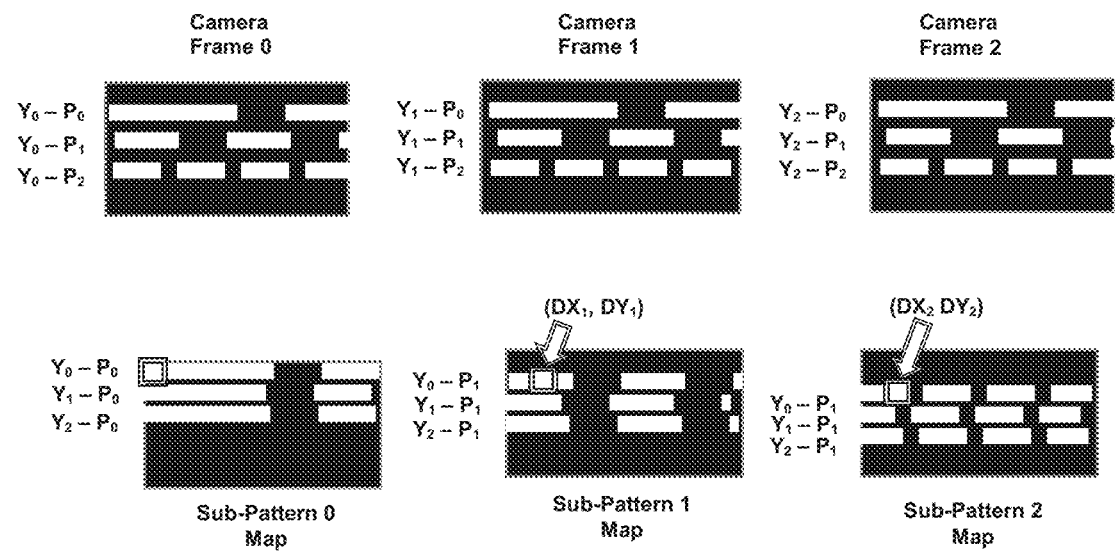
FIG. 15 shows the reflected patterns for sub-pattern processing and alignment in the simple of a linear projection using three sub-patterns.

FIG. 15 shows a simple example of the processing and alignment linear projection sub-pattern using three linear sub-patterns. As the leading edge of the object sweeps through each of the sub-patterns a sequence of images (Frame 0, Frame 1, Frame 2) is acquired. Each image corresponds to an encoder position ($Y_N$) and includes intensity information for each sub-pattern ($P_N$). The images are rectified and sampled to individual sub-pattern maps using fixed world X-Y step. Corresponding intensities are aligned in X-Y using offsets captured during in-field calibration ($DX_N$, $DY_N$).

Pattern Decoding/Correspondence

During the correspondence stage of the processing pipeline, the individual sub-pattern intensities are combined to calculate the projector pattern coordinates of each object point of interest.

The methodology can be applied to any sequence of sub-patterns, for which any given Y slice produces a unique set of intensities. At least two sub-patterns are used according to the invention, though several more may be required to establish reliable unique correspondence. A robust approach widely covered in structured light literature is the combination is Gray code and phase shifting.

Gray code is a sequence of binary patterns with increasing density, which allows coarse but global correspondence, by separating the image into regions with unique combinations of high and low intensity.

Figure 16:
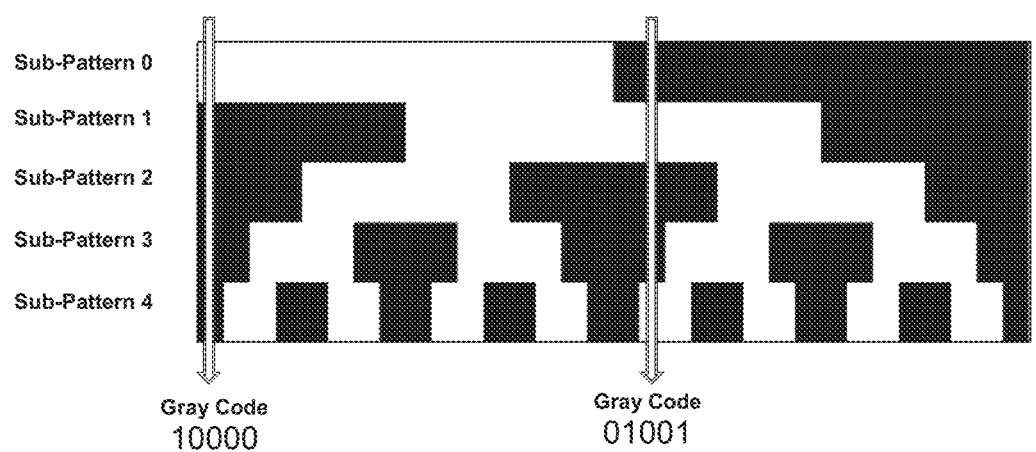
FIG. 16 illustrates the assessment of correspondence using solely Gray Code decoding; and, FIG. 17 illustrates the assessment of correspondence using phase encoding sub-patterns.

FIG. 16 illustrates the methodology by which Gray code is used to encode regions of the projected surface. By staggering binary intensities of increasing density, the pattern is broken into regions with unique combination of high and low intensity (e.g. Gray Code 10000 or Gray Code 01001). In the example where five binary patterns Sub-Pattern 0 to Sub-Pattern 4 are used, the number of unique regions is $2^5$ or 32. The number of binary patterns depends on the application, and may vary depending on the resolution (fewer patterns limit correspondence accuracy) and speed (fewer patterns allow for higher speed)

While providing global correspondence, Gray code isn't sufficient in establishing local sub-pixel correspondence. For this purpose a sequence of sinusoidal patterns Sub-Pattern 5 to Sub-Pattern 7 with increasing phase offset (phase sequence) is used. Each phase pattern preferably has a period equal the width of the densest Gray code stripe, and each phase image is offset from the previous by 360°/N, where N is the total number of phase patterns.

For any given object point, the combination of phase intensities is used to solve for the local phase value with sub-pixel precision. The calculation for the phase value $\varphi_x$ at a given image coordinate x is as follows:

$$\varphi_x = \tan^{-1} \frac{\sum_{N-1}^{0} I_{ix} \sin \theta_i}{\sum_{N-1}^{0} I_{ix} \cos \theta_i}$$

In the above equation, $I_{ix}$ corresponds to the image intensity at a given x coordinate for sub-pattern i, while $\theta_i$ corresponds to the phase angle of each phase sub-pattern i.

Figure 17:
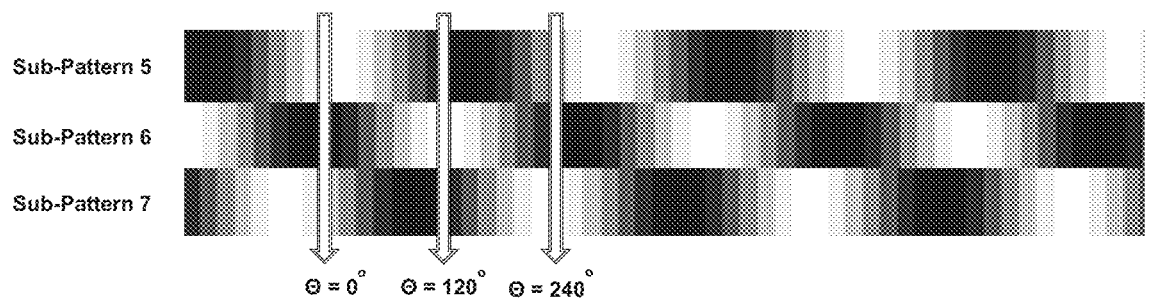

In FIG. 17, the phase angles of the sub-patterns are 0°, 120°, 240°. Derivations of this formula are widely available in structured light literature. While the minimum number of patterns required to correctly solve for the individual pixel phase angle is three, a greater number of phase sub-patterns reduces the effects of noise and saturation. The number of phase sub-patterns chosen for a particular application depends on its speed and accuracy requirements, as increasing the number of phase-patterns also increases image size and, thus, reduces acquisition speed.

The phase value is periodic (ranging from 0° to 360°), with the period equal to the width of a Gray code partition. The combination of global Gray code and local phase values produces the continuous per-pixel correspondence function required for our design.

Range Lookup/Triangulation

From factory calibration, the relationship between camera and projection geometry is known. Specifically, each projector and camera coordinate maps to a ray in the world space. The correspondence step calculates projector coordinates for each camera pixel, which allows us to intercept the corresponding rays to generate the world 3D points.

In practice, through several pre-processing steps this operation is simplified to a two-dimensional lookup table with entries representing function $(X_W, Y_W, Z_W)=f(X_r, P)$, where $(X_W, Y_W, Z_W)$ are the output world coordinates, $X_r$ is the rectified X coordinate within the sub-pattern 0 phase intensity map, and P is the global projection X coordinate (combination of Gray code and phase value).

The above description has involved a configuration where a single camera and a single projection (emitting a 2D pattern) are used. However, several alternative configurations can be used in the invention.

Rather than using a single 2D camera imaging the entire 2D pattern, an alternative configuration can be based on several linear (1D) cameras, each aligned to image a single sub-pattern by capturing intensities along a plane that falls along the sub-pattern. While alignment and packaging of such configuration is more difficult than the single 2D camera option, linear camera arrays can reach speeds that are significantly higher than 2D imagers. In the case of 1D cameras, in-field calibration is still used to determine the relative X-Y offsets in the imaged sub-patterns. When combining the ray images into sub-pattern maps, the intensity of any given sub-pattern is acquired from the camera corresponding to that sub-pattern. Once the individual sub-pattern maps are assembled and aligned, the determination of correspondence is then performed in the same manner as for the case of a two-dimensional image capture of the entire two-dimensional pattern.

The technique also applies to the use of several 2D or 1D cameras, imaging the pattern from multiple orientations (stereo, multi-view), as such configurations can improve occlusion coverage and reduce the number of dropped data points for objects with high specularity.

The approach is not limited to any one projection technique. The unit emitting the 2D linear pattern can, for example, utilize a programmable projector (e.g. DLP), a single-purpose projection mask, a laser with a diffractive optical element, or a combination of several linear laser modules.

Figure 7:
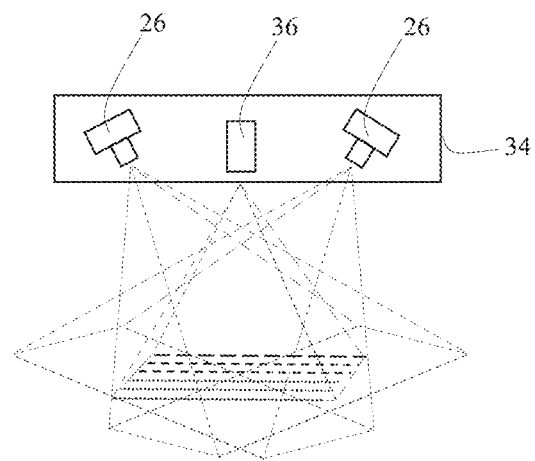
FIG. 7 is a diagram of the optical configuration of an alternative embodiment.
Figure 8:
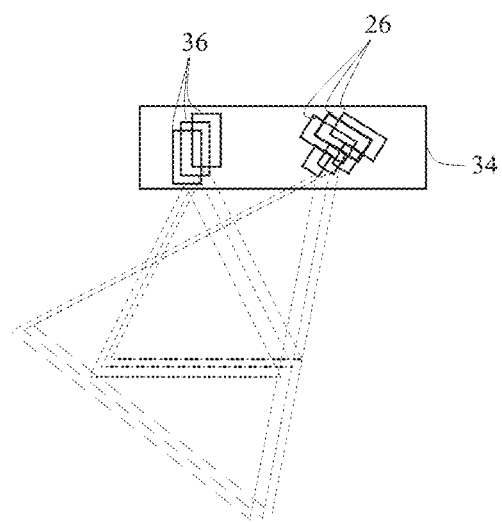
FIG. 8 is a diagram of the optical configuration of a second alternative embodiment.
Figure 9:
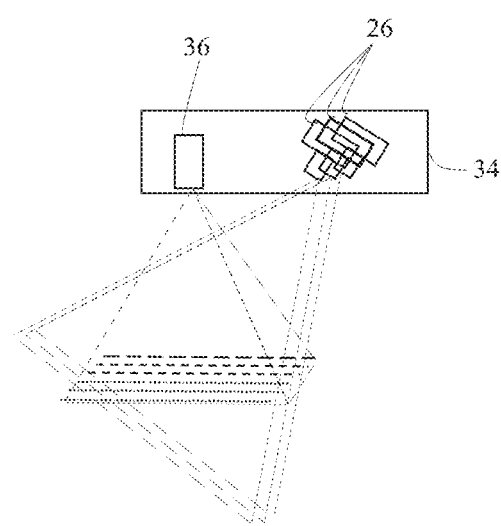
FIG. 9 is a diagram of the optical configuration of a third alternative embodiment.
Figure 10:
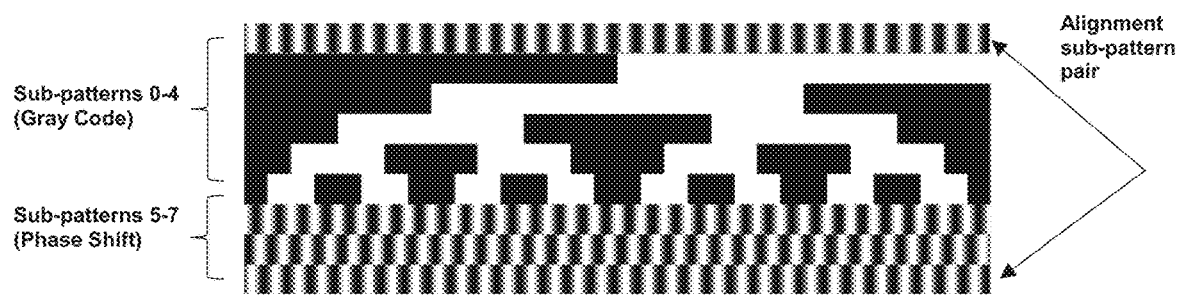
FIG. 10(a) illustrates the two-dimensional structured light pattern as seen by the eye or the camera according to the preferred embodiment of the invention.
FIG. 10(b) shows the intensity profiles of the pattern of FIG. 10(a)
Figure 10:
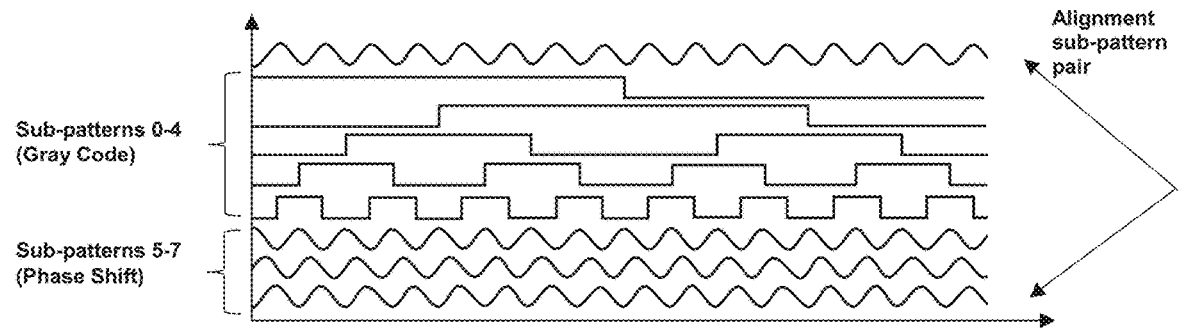

FIGS. 6, 7 and 8 illustrate three example configurations for the linear fringe projection methodology. FIG. 6 shows the default configuration with a single 2D imager and a single 2D projector. FIG. 7 shows a multi-camera/single projection configuration which can be utilized to improve occlusion coverage and specular performance by providing varying fields of view for the respective cameras. The configuration of FIG. 8 uses several linear imagers aligned to the corresponding single line emitters. The configuration of FIG. 9 uses a single two-dimensional projector but several linear imagers each of which is aligned to image a plane that extends along and through a single one of the sub-patterns.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A method for determining three-dimensional coordinates of a plurality of object points of an object, said object moving in a direction of motion along an inspection path in an in-line inspection system, comprising:

projecting onto said path structured light forming a two-dimensional pattern, said two-dimensional pattern being such that any one-dimensional slice of said pattern in the direction of motion is unique within said pattern, said two-dimensional pattern comprising at least two linear sub-patterns disposed in parallel within said two-dimensional pattern, each of said at least two linear sub-patterns varying in intensity only along a direction that is orthogonal to the direction of motion;

capturing temporally sequential images of said structured light as reflected from said object points as said object moves along said path, so as to produce, for each of said object points, at least one image of each of said sub-patterns;

analyzing said images to:

determine correspondence between the images in relation to each of said object points by reference to at least a plurality of said sub-patterns; and, determine three-dimensional coordinates for each of said object points.

2. The method of claim 1 further comprising:

orienting said two-dimensional pattern in relation to a camera having a two-dimensional imager array such that an axis of said array is parallel to said linear sub-patterns.

3. The method of claim 1 or claim 2 wherein said sub-patterns comprise at least one binary intensity sub-pattern and at least one continuously varying sub-pattern.

4. The method of claim 1 or claim 2 further comprising performing an in-field calibration to determine the respective precise positions and orientations of said respective sub-patterns in relation to said direction of motion.

5. The method of claim 1 wherein the step of projecting is performed using a single light projector emitting said two-dimensional pattern and the step of capturing is performed using a single camera having a two-dimensional imager array.

6. The method of claim 1 wherein the step of capturing is performed using a plurality of linear array one-dimensional cameras, each of said plurality of cameras being aligned to image respective ones of said sub-patterns.

7. The method of claim 1 wherein the step of capturing is performed using a plurality of cameras each having a two-dimensional imager array, each of said plurality of cameras having respectively different fields of view of said object.

8. The method of claim 1 wherein the step of projecting is performed using a plurality of projectors, each emitting respective ones of said sub-patterns.

9. The method of claim 8 wherein the step of capturing is performed using a plurality of linear array one-dimensional cameras, each of said plurality of cameras being aligned to image respective ones of said sub-patterns.

10. An optical three-dimensional scanning system comprising:

a conveyor for conveying an object in a direction of motion along an inspection path in an in-line inspection system;

at least one projector configured to project onto said path structured light forming a two-dimensional pattern, said two-dimensional pattern being such that any one-dimensional slice of said pattern in the direction of motion is unique within said pattern, said two-dimensional pattern comprising at least two linear sub-patterns disposed in parallel within said two-dimensional pattern, each of said at least two linear sub-patterns varying in intensity only along a direction that is orthogonal to the direction of motion;

at least one camera coupled to said at least one projector and configured to capture temporally sequential images of said structured light as reflected from said object as said object moves along said path, so as to produce, for each of a plurality of object points of interest, at least one image of each of said sub-patterns;

a processor coupled to said camera to determine correspondence between said temporally sequential images by reference to at least two of said sub-patterns and to determine three-dimensional coordinates of said object points of interest.

11. The system of claim 10 wherein said camera comprises a two-dimensional imager array and said at least one projector is configured to project said two-dimensional pattern such that an axis of said array is parallel to said linear sub-patterns.

12. The system of claim 10 wherein said sub-patterns comprise at least one binary intensity sub-pattern and at least one continuously varying sub-pattern.

13. The system of claim 10 wherein said at least one projector is a single light projector emitting said two-dimensional pattern and said at least one camera is a single camera.

14. The system of claim 10 wherein said at least one camera comprises a plurality of linear array one-dimensional cameras, each of said plurality of cameras being aligned to image respective ones of said sub-patterns.

15. The system of claim 10 wherein said at least one camera comprises a plurality of cameras each having a two-dimensional imager array, each of said plurality of cameras having respectively different fields of view of said object.

16. The system of claim 10 wherein said at least one projector comprises a plurality of projectors, each emitting respective ones of said sub-patterns.

17. The system of claim 16 wherein said at least one camera comprises a plurality of linear array one-dimensional cameras, each of said plurality of cameras being aligned to image respective ones of said sub-patterns.

* * * * *